(12) United States Patent
Umemoto et al.

(10) Patent No.: US 6,199,995 B1
(45) Date of Patent: Mar. 13, 2001

(54) LIGHT GUIDE PLATE, PLANER LIGHT SOURCE UNIT AND REFLECTION-TYPE LIQUID-CRYSTAL DISPLAY DEVICE

(75) Inventors: Seiji Umemoto; Shuji Yano, both of Osaka (JP)

(73) Assignee: Nitto Denko Corporation, Osaka (JP)

( * ) Notice: Under 35 U.S.C. 154(b), the term of this patent shall be extended for 0 days.

(21) Appl. No.: 09/258,256

(22) Filed: Feb. 26, 1999

(30) Foreign Application Priority Data

Feb. 26, 1998 (JP) ................................................. 10-064311

(51) Int. Cl.⁷ ........................................................ F21V 7/04
(52) U.S. Cl. ................................................. 362/31; 362/26
(58) Field of Search ............................... 362/261, 31, 27; 385/116

(56) References Cited

U.S. PATENT DOCUMENTS 5,727,107 * 3/1998 Umemoto et al. ................... 385/116

FOREIGN PATENT DOCUMENTS

| 0 545 705 | 6/1993 | (EP) | ............................ G02F/1/1335 |
| 0 787 942 | 8/1997 | (EP) | ............................ F21V/8/00 |
| 0 867 747 | 9/1998 | (EP) | ............................ G02F/1/1335 |
| 0 879 991 | 11/1998 | (EP) | ............................ F21V/8/00 |
| 8-94844 | 4/1996 | (JP) | ............................ G02B/6/00 |
| WO 93/16410 | 8/1993 | (WO) | ............................ G02F/1/1335 |
| WO 95/34009 | 12/1995 | (WO) | ............................ G02B/6/00 |

* cited by examiner

Primary Examiner—Stephen Husar
(74) Attorney, Agent, or Firm—Sughrue, Mion, Zinn, Macpeak & Seas, PLLC

(57) ABSTRACT

A light guide plate in which the light incident on an entrance end surface is allowed to emerge from a bottom surface view a light issuing means formed on a top surface, with the direction of maximum intensity of the emerging light as measured in a plane perpendicular to the two reference planes defined by said entrance end surface and said bottom surface being within 30 degrees from the line normal to said bottom surface and wherein when the direction toward the entrance end surface away from said normal line taken as the reference is assumed to be negative, the intensity of the light leaking from the top surface at the same angle as the direction of said maximum intensity is no more than a tenth of said maximum intensity, with the incident light from the bottom surface being transmitted through the top surface; a planer light source unit having a light source adjacent the entrance end surface of the light guide plate; and a reflection-type liquid-crystal display device having a reflective layer furnished, liquid-crystal cell provided beneath the bottom surface of the planer light source unit.

31 Claims, 4 Drawing Sheets

LIGHT GUIDE PLATE, PLANER LIGHT SOURCE UNIT AND REFLECTION-TYPE LIQUID-CRYSTAL DISPLAY DEVICE

BACKGROUND OF THE INVENTION

1. Field of the Invention

The present invention relates to a light guide plate capable of forming a bright and high-contrast reflection-type liquid-crystal display device, and a planer light source unit that uses the light guide plate to permit efficient utilization of light.

The present application is based on Japanese Patent Application No. Hei. 10-64311, which is incorporated herein by reference.

2. Description of the Related Art

To meet the current need for illumination equipment that enabled the viewing of a reflection-type liquid-crystal display device in the dark or other situations, the present inventors attempted the application of a front light system in which the back light used in a transmission-type liquid-crystal display device was provided on the viewing side of the liquid-crystal cell. The back light uses a light guide plate that receives incident light on a side and that allows it to emerge from either the top or the bottom surface through a light issuing means. The front light system allows the display to be viewed via the light guide plate.

However, the back light using the conventional light guide has involved difficulty in attempts for commercialization since it suffers from various problems such as low contrast in ON state, low brightness in OFF state and disturbed display.

It should also be mentioned that a back light using a light guide plate in which diffusing dots or fine asperities form a light issuing means provides only low contrast during viewing in On state and also provides low contrast and insufficient display brightness during viewing in OFF state with extraneous light such as indoor illumination; in addition, the display image that can be viewed through the light guide plate is so extensively disturbed that it lacks clarity.

A back light is known that uses a light guide plate in which a stepped prism structure consisting of inclined surfaces having a slope of 45 degrees and flat surfaces (zero degrees of inclination) form a light issuing means (as described in Japanese Patent Publication No. Sho. 62-73206). Even this back light has the disadvantage of giving low contrast and insufficient display brightness during viewing in ON state.

SUMMARY OF THE INVENTION

Accordingly, an object of the present invention is to develop a reflection-type liquid-crystal display device that gives high contrast during viewing in both OFF state and ON state, that provides a highly bright display and that creates a display image through a light guide plate that is less disturbed and features high clarity.

Another object of the invention is to develop a light guide plate and a planer light source unit that are capable of forming the reflection-type liquid-crystal display device.

The present invention provides a light guide plate in which the light incident on an entrance end surface is allowed to emerge from a bottom surface via a light issuing means formed on a top surface, with the direction of maximum intensity of the emerging light as measured in a plane perpendicular to the two reference planes defined by said entrance end surface and said bottom surface being within 30 degrees from the line normal to said bottom surface and wherein when the direction toward the entrance end surface away from said normal line taken as the reference is assumed to be negative, the intensity of the light leaking from the top surface at the same angle as the direction of said maximum intensity is no more than a tenth of said maximum intensity, with the incident light from the bottom surface being transmitted through the top surface.

The present invention also provides a planer light source unit having a light source adjacent the entrance end surface of said light guide plate, as well as a reflection-type liquid-crystal display device having a reflective layer furnished, light-crystal cell provided beneath the bottom surface of the planer light source unit.

According to the invention, one can produce a light guide plate in which the light emerging from the bottom surface has high directivity in a vertical direction-and in which the leakage light from the top surface is less likely to overlap a display image. Using this light guide plate, one can produce a planer light source unit capable of efficient utilization of light and can hence provide a reflection-type liquid-crystal display device that gives high contrast during viewing in both OFF and ON states, that provides a highly bright display and that creates a display image through the light guide plate that is less disturbed and features high clarity and display quality.

These advantages of the invention are based on the characteristics imparted to the light guide plate. While making intensive studies in order to solve the aforementioned problems, the present inventors found the following facts about light guide plates using the above-mentioned diffusing dots or fine asperities as light issuing means: as shown in FIGS. 9 and 10, transmitted light incident on a side of the light guide plate 18 is divergent in almost all directions on account of the scattering by the light issuing means and due to its scattering characteristics, both the light $\alpha_1$ emerging from the bottom surface and the leakage light $\beta_3$ from the top surface have maximum intensity (B or b) in a direction that forms an angle of about 60 degrees ($\theta_4$) with the line H dropped normal to the bottom surface (looked into the front surface) and their maximum intensities are substantially the same; hence, the quantity of light in the directions effective for viewing, particularly, in the viewing angle range of from about 15 degrees up to about 30 degrees down in longitudinal direction with reference to said normal line and in the range of about 30 degrees both to the right and the left in a transverse direction, is small enough to provide an insufficiently bright display; in addition, the light $\alpha_2$ emerging from the bottom surface to form the display image overlaps the leakage light $\beta_4$ from the top surface, thereby producing only low contrast; in OFF state, the scattered light $\gamma_2$ washes out the display image to reduce its contrast; what is more, due to the scattering caused by the light guide plate, rays of display light $\gamma_1$ and $\gamma_3$ mix together and the display image is extensively disturbed.

It has been found that the same problem occurs in the light guide plate having the prism-like light issuing means according to Japanese Patent Publication No. Sho. 62-73206. So much light leaks from the top surface of the light guide plate that it overlaps the display image forming light emerging from the bottom surface, thereby lowering the contrast of the image. In addition, more light emerges at great angles that the light issuing in the directions effective for viewing and, as a result, the brightness of the display decreases to deteriorate its quality.

Therefore, in order for the light guide plate to form a bright and clear display image, it is required that the light incident on a side emerge from the bottom surface with high directivity, particularly at an angle of $\theta_3$ which is the nearest possible to the normal H to the bottom surface as illustrated by the arrow A in FIG. 4, preferably with a high degree of convergence within the above-stated viewing angle range. Reflection-type liquid-crystal display devices usually intend to produce uniform and clear displays via a roughened reflective layer having an average diffusing angle of about 5 to 15 degrees. Therefore, if more of the incident light (B in FIG. 9 and $\alpha_1$ in FIG. 10) forms a large angle with the reflective layer, less of the light emerges in the directions effective for viewing and this introduces difficulty in providing a bright display. In addition, large-angle viewing increases the chance of display inversion and massive color charges tend to occur in displays of a field birefringence type.

For higher contrast, it is required that the leakage light from the top surface (as indicated by a in FIG. 4) make the least overlap with the display image forming light A emerging from the bottom surface, the overlap being preferably the smallest possible within the above-stated viewing angle range. Reflection-type liquid-crystal display devices usually have contrast ratios of 1:5 to 1:20, so the overlap between the leakage light and the display image has a substantial effect on the contrast ratio.

To prevent the formation of a disturbed display image, it is required that both the light being transmitted from the top to the bottom surface and the light being transmitted in opposite way should be the least scattered. The front light in a reflection-type liquid crystal display device is an auxiliary light source that enables viewing in the dark, inherently using extraneous light such as indoor illumination or other available light with a view to reducing power consumption. If, in its normal OFF state, the front light is prevented by the light guide plate from receiving extraneous light, a dark display is produced. If scattering occurs on the light guide plate, its surface is washed out to give a lower contrast or the display image becomes disturbed, mostly due to the mixing of rays of display light.

To further improve the display quality, it is desired to accomplish clear displays that do not have high proportions of unnaturalness or disturbances. The pitch of pixels in liquid-crystal display devices is generally 100 to 300 $\mu$m, so it is desired that information having a pitch of about 100 $\mu$m be clearly discernible with the effects of the light guide plate on light transmission being controlled to minimum. Also desired is satisfactory display quality that is controlled in moire.

Features and advantages of the invention will be evident from the following detailed description of the preferred embodiments described in conjunction with the attached drawings.

DETAILED DESCRIPTION OF THE PREFERRED EMBODIMENTS

Figure 1:
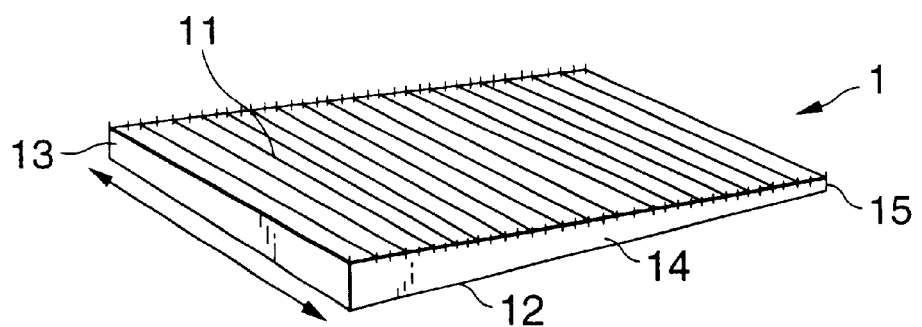
FIG. 1 is a perspective view illustrating a light guide plate.

The light guide plate according to the invention is such that the light incident on an entrance end surface is allowed to emerge from a bottom surface via a light issuing means formed on a top surface, with the direction of maximum intensity of the emerging light as measured in a plane perpendicular to the two reference planes defined by said entrance end surface and said bottom surface being within 30 degrees from the line normal to said bottom surface and also such that when the direction toward the entrance end surface away from said normal line taken as the reference is assumed to be negative, the intensity of the light leaking from the top surface at the same angle as the direction of said maximum intensity is no more than a tenth of said maximum intensity, with the incident light from the bottom surface being transmitted through the top surface.

Examples of the light guide plate according to the invention are shown in FIGS. 1 and 2a to 2c. Indicated by 1 is the light guide which comprises of the top surface 11, 16 or 17 forming a light issuing means, the bottom surface 12 serving as an exit end, an entrance end surface 13, transverse side surfaces 14, and a far end 15 which is opposed to the entrance end surface.

The light guide plate according to the invention is such that the light incident on the entrance end surface is allowed to emerge from the bottom surface via the light issuing means formed on the top surface. Assuming a plate-like shape, it generally has a top surface, an opposed bottom surface, and an entrance end surface connecting the top and bottom surfaces. The plate may have the same thickness throughout but, preferably, the thickness of the far end 15 opposed to the entrance end surface 13 is smaller than that of the entrance end surface as in the illustrated case; the far end 15 is preferably at least less than half in thickness of the entrance end surface.

Figure 2A:
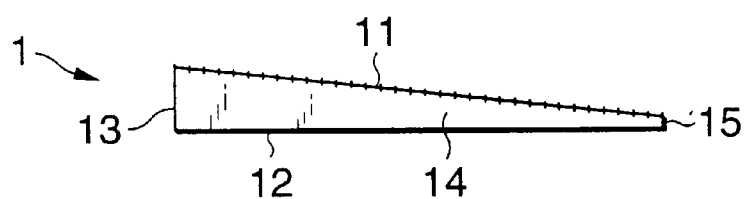
FIGS. 2A to 2C are side views illustrating three different types of light guide plate.
Figure 2B:
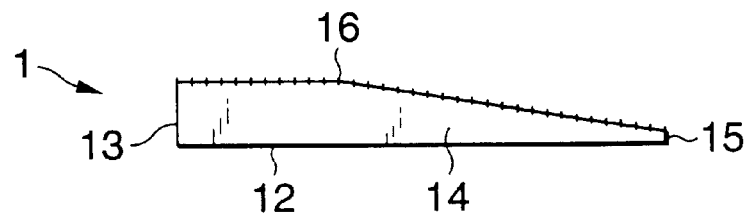
Figure 2C:
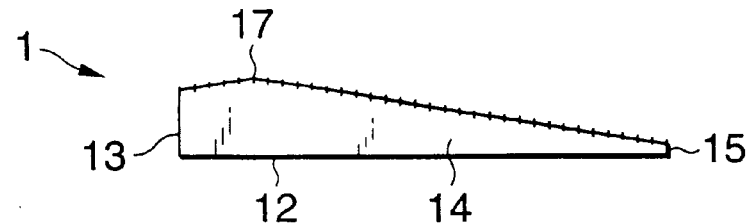

Making the opposed end 15 thinner than the entrance end surface 13 offers several advantages; first, the incident light on the entrance end surface (indicated by thick arrows in FIGS. 3A and 3B, and 4) travels to the opposed end after being launched efficiently into the light issuing means formed on the top surface and emerging from the bottom surface after reflection and other phenomena, whereby the incident light is efficiently supplied to the target surface; second, the light guide plate can be reduced in weight. Take, for example, the case where the top surface forms a straight plane as shown in FIG. 2A; the weight of a light guide plate whose thickness decreases toward the far end 15 is about 75% of the weight of a light guide plate having a uniform thickness.

The light guide plate of the invention suffices to show the exit characteristics described above. Hence, the light issuing means to be provided on the top surface of the aforementioned plate-like shape may be formed of any suitable elements that show such characteristics. Mainly from the viewpoint of ease in attaining the stated characteristics, the light issuing means is preferably composed of prismatic asperities.

Figure 3A:
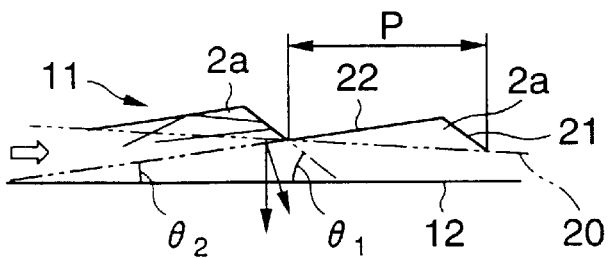
FIGS. 3A and 3B are side views illustrating prismatic asperities.
Figure 3B:
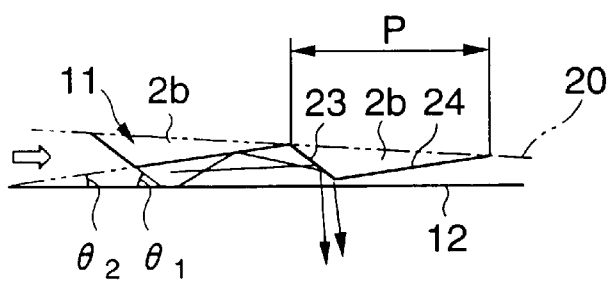

Such prismatic asperities may be formed of ridges or grooves bounded by planes of equal sides; however, mainly from the viewpoint of efficient utilization of light, the prismatic asperities are preferably formed of ridges or grooves each bounded by a plane of the shorter side and a plane of the longer side. An example of such prismatic asperities is shown in FIGS. 3A and 3B, in which 2a refers to a ridge, 2b is a groove, 21 and 23 are planes of the shorter side, and 22 and 24 are planes of the longer side. The criterion for determining whether a certain shape is a ridge or groove is the line connecting the point at which a plane of the shorter side crosses the plane on which it is formed and the point at which a plane of the longer side or the like crosses the plane on which it is formed. If the point at which the plane of the shorter side crosses the plane of the longer side or the like (this point may be referred to as "vertex") projects beyond the above-defined line, the shape is a ridge; if the crossing point is below that line, the shape is a groove.

Referring to the case illustrated in FIGS. 3A and 3B, the criterion is a line 20 indicated by a phantom line connecting the point at which a plane of the shorter side 21 (or 23) that forms a certain shape crosses the plane on which it is formed and the point at which a plane of the longer side 22 (or 24) that forms the shape crosses the plane on which it is formed; the ridge 2a is so called since the point (vertex) at which the plane of the shorter side crosses the plane of the longer side length is above the line 20 whereas the groove 2b is so called since it is below the line 20.

Figure 4:
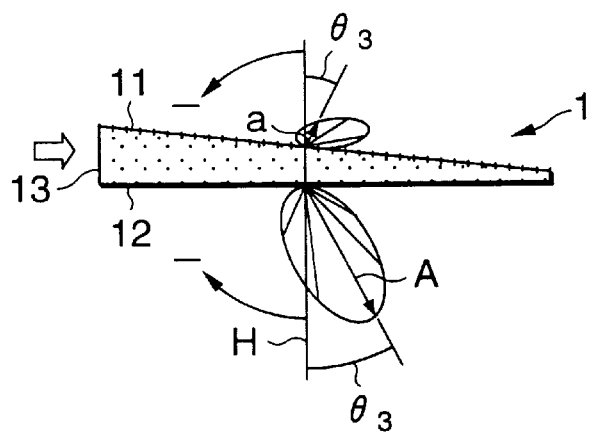
FIG. 4 is a diagram illustrating the exit characteristics according to the present invention.

Mainly from the viewpoint of improving the display quality such as brightness and contrast that can be attained with the light guide plate of the invention if it is assembled into a reflection-type liquid-crystal display device, a preferred light guide plate is of the type shown in FIG. 4, in which the direction $\theta_3$ for maximum intensity A of the light emerging from the bottom surface 12 after the incident light (indicated by a thick arrow) was launched into the entrance end surface 13 is within 28 degrees, more preferably, 25 degrees, most preferably 20 degrees from the line H normal to said bottom surface 12 as measured in a plane (cross section on the paper) perpendicular to the two reference planes defined by the entrance end surface 13 and the bottom surface 12.

The light guide plate is preferably such that when the direction toward the entrance end surface 13 away from said normal line H taken as the reference is assumed to be negative, the intensity of the light a leaking from the top surface 11 at the same angle $\theta_3$ as the direction of maximum intensity A is of the smallest possible value not more than a tenth of said maximum intensity A, more preferably no more than ¹⁄₁₅, most preferably no more than ¹⁄₂₀, of A. Said leakage light a overlaps the light of maximum intensity A when the latter is reflected in a positive direction; therefore, if the value of a/A is great, the relative intensity of the display image and hence the contrast is reduced.

Mainly from the viewpoint of improving the display quality such as contrast that can be attained with the light guide plate of the invention if it is assembled into a reflection-type liquid-crystal display device, a preferred light guide plate is such that the luminance of the light emerging from the bottom surface as measured in the direction of the line normal to the above-defined perpendicular plane is no more than 60%, more preferably no more than 50%, most preferably no more than 40%, of the luminance in said direction of maximum intensity. This is because liquid-crystal cells usually entail 4 to 5% surface reflection and due to this surface reflection, the light emerging in the direction of said normal line is brought back near to the vertical direction which is a typical viewing angle for liquid-crystal display devices and the resulting overlap with the display light lowers the contrast and other elements of the display quality.

In addition, mainly from the viewpoint of improving the display quality such as display's sharpness that can be attained with the light guide plate of the invention if it is assembled into a reflection-type liquid-crystal display device, a preferred light guide plate is such that the quantity of light leaking from the top surface within 30 degrees of a solid angle about the above-defined normal line H is no more than ⅛, more preferably no more than ¹⁄₁₀, most preferably no more than ¹⁄₂₀, of the quantity of light emerging from the bottom surface. Such leakage light also lowers the contrast and other elements of the display quality by overlapping the display light during viewing near the vertical direction. If such leakage light is controlled, any unwanted light that deteriorates the display quality is eliminated to produce a sharper display.

Mainly from the viewpoint of satisfying the aforementioned condition for the direction of maximum intensity and for attaining chateristics such as the ratio of maximum intensity to the intensity of leakage light, the luminance ratio between the normal direction and the direction of maximum intensity and the ratio of the quantity of the leakage light from the top surface within a specified solid angle to the quantity of the light emerging from the bottom surface, a preferred light issuing means is as illustrated in FIGS. 3A and 3B and has as its structure a repetition of prismatic asperities (ridge 2a or groove 2b) each comprising a plane of the shorter side inclined at an angle ($\theta_1$) of 30 to 45 degrees with the reference plane defined by the bottom surface 12 and a plane of the longer side inclined at an angle ($\theta_2$) greater than zero degrees up to 10 degrees.

In the structure described above, the plane of the shorter side 21 or 23 that is formed as an inclined surface sloping downward from the entrance side 13 to the opposed side 15 functions in such a way that those rays of the incident light from a side which are launched into said plane are reflected to be supplied to the bottom surface (from which the light emerges). If the angle of inclination, $\theta_1$, of the plane of the shorter side is adjusted to lie within the range of 30 to 45 degrees, the transmitted light is reflected at an angle of high perpendicularity to the bottom surface as indicated by a kinked arrow in FIGS. 3A and 3B, thus ensuring efficient emergence of light from the bottom surface that has maximum intensity A in the direction $\theta_3$ within 30 degrees from the line H normal to the bottom surface (see FIG. 4).

If the light guide plate is assumed to have a refractive index of 1.5, Snell's law dictates that the transmitted light is within the range of ±41.8 degrees and travels to the opposed end as it repeats total reflection along the way. Therefore, if the angle of inclination $\theta_1$ of the plane of the shorter side is adjusted to lie within the stated range (30 to 45 degrees), said plane reflects the transmitted light such that it emerges from the bottom surface with high degree of perpendicularity. Of course, a portion of the transmitted light fails to satisfy the condition for total reflection simply passes through the plane of the shorter side; however, such leakage light emerges from the bottom surface at a large angle in excess of 60 degrees with the normal line and has no significant effects on viewing at angles near the vertical direction.

Mainly from the viewpoint of ensuring the aforementioned performance including the control of leakage light and the resulting interference with viewing, the angle of inclination $\theta_1$ of the plane of the shorter side is preferably in the range of 32 to 44 degrees, more preferably 33 to 43 degrees, most preferably 35 to 42 degrees. If $\theta_1$ is less than 30 degrees, the direction of maximum intensity of the light emerging from the bottom surface forms such a great angle with the normal line that less light is available for effective viewing and the brightness tends to decrease. If $\theta_1$ exceeds 45 degrees, more light tends to leak from the top surface.

The function of the plane of the longer side is two-fold. First, it reflects the incident light being transmitted to be supplied to the plane of the shorter side. Second, it transmits the display image from the liquid-crystal cell of a reflection-type liquid-crystal display device into which the light guide plate of the invention is assembled. From this viewpoint, the angle of inclination $\theta_2$ of the plane of the longer side with respect to the reference plane defined by the bottom surface 12 must be greater than zero degrees and up to 10 degrees. If this condition is met, transmitted light incident on the plane of the longer side 22 (or 24) at an angle greater than $\theta_2$ is reflected as indicated by a kinked arrow in FIGS. 3A and 3B; due to the inclination of the plane of the longer side, the light is reflected in a direction having a great degree of parallelism with respect to the bottom surface 12 and incident on the adjacent plane of the shorter side 21 (or 23), from which it is reflected and emerges from the bottom surface 12 with the high degree of convergence attained by the above-described collimating effect.

Thus, in addition to the transmitted light that is directly incident on the plane of the shorter side, the transmitted light that is first incident on the plane of the longer side from which it is reflected to be incident on the adjacent plane of the shorter side is also reflected by that plane of the shorter side and supplied to the bottom surface, thereby achieving a corresponding improvement in the efficient utilization of the incident light. As a further advantage, the incident angle of the light that falls upon the plane of the shorter side after reflection from the plane of the longer side can be made uniform enough to suppress the variation in the angle of reflection, thereby ensuring the emergence of collimated and convergent light. Thus, by adjusting the angle of inclination of the plane of the shorter side and that of the plane of the longer side to lie within the stated ranges, high degree of directivity can be imparted to the emergence of light and light can be allowed to emerge from the bottom surface in directions that are either perpendicular to the bottom surface or at angles near the normal line.

If the angle of inclination of the plane of the longer side is zero degrees (if it is not inclined at all), it is less effective in collimating the transmitted light. If the angle of inclination of the plane of the longer side exceeds 10 degrees, less light is incident on the plane of the longer side and the supply of light toward the opposed end becomes insufficient to achieve uniform light emission. A problem also arises to the cross-sectional shape of the light guide plate and difficulty is encountered in reducing the thickness of the opposed end of the plate; less light is incident on the prismatic asperities and the efficiency of light emission tends to decrease. Mainly from the viewpoint of attaining the stated performance including the production of convergent exit light by collimating the transmitted light and for the control of leakage light, the angle of inclination $\theta_2$ of the plane of the longer side is preferably not greater than 8 degrees, more preferably not greater than 5 degrees.

Mainly from the viewpoint of ensuring visibility of the display image via planes of the longer side on the light guide plate, preferred planes of the longer side are such that the variation in the angle of inclination $\theta_2$ as measured throughout the light guide plate is within 5 degrees, more preferably within 4 degrees, most preferably within 3 degrees and that the difference in $\theta_2$ between a plane of the longer side and the nearest plane of the longer side is within 1 degree, more preferably within 0.3 degrees, most preferably within 0.1 degree. If these conditions are met, it is possible to suppress the effects that may be caused on the display image by the difference in the angle of inclination $\theta_2$ between planes of the longer side through which light is transmitted. If the deviation in the angle of light transmission through planes of the longer side differs greatly from one place to another, an unnatural display image will be produced and particularly in the case where a significant difference occurs in the deviation of the transmitted image near neighboring pixels, the display image tends to become quite unnatural.

The above-stated condition for the difference in the angle of inclination presupposes that $\theta_2$ which represents the angle of inclination of the plane of the longer side is in excess of zero degrees and up to 10 degrees. In other words, $\theta_2$ must be sufficiently small that the deviation of the display image due to refraction that occurs when light passes through the plane of the longer side is controlled not to exceed a permissible value; this is to ensure that there will be no change in the optimal viewing direction of the liquid-crystal display device of which the point of observation has been optimized by setting it near the vertical direction. If the display image is deflected, the optimal viewing direction is offset from angles near the vertical direction; in addition to that, if the deviation of the display image is great, the viewing angle comes closer to the direction in which the leakage light emerges from the top surface of the light guide plate, often causing adverse effects such as lower contrast. Note that the condition that $\theta_2$ or the angle of inclination of the plane of the longer side be in excess of zero degrees and up to 10 degrees also includes other requirements such as the need to reduce any adverse effects such as the dispersion of transmitted light to a negligible level.

From the viewpoint of producing a bright display image, it is preferred that extraneous light is incident with high efficiency and that the display image from the liquid-crystal cell can be transmitted or allowed to emerge with high efficiency. Considering this point, preferred prismatic asperities are such that the area of the plane of the longer side as projected onto the reference plane defined by the bottom surface is at least 5 times, more preferably at least 10 times, most preferably at least 15 times, the projected area of the plane of the shorter side. If this condition is met, most of the display image from the liquid-crystal cell can be transmitted via the planes of the longer side.

Further referring to the transmission of the display image from the liquid-crystal cell, the display image incident on the plane of the shorter side is reflected toward the entrance end surface and does not emerge from the top surface or if it does emerge, it is deflected at such a great angle away from the display image transmitted through the plane of the longer side with reference to the normal to the bottom surface that it hardly affects the display image transmitted via the plane of the longer side. From this viewpoint, therefore, the planes of the shorter side are preferably not localized with respect to the pixels in the liquid-crystal cell. If, in an extreme case, the planes of the shorter side overlap the pixels throughout the liquid-crystal cell, the display image via the planes of the longer side is hardly visible at angles near the vertical direction.

Therefore, mainly from the viewpoint of preventing the formation of an unnatural display due to insufficient transmission of the display light, the area over which the pixels overlap the planes of the shorter side is preferably reduced to ensure adequate transmission of light via the planes of the longer side. Considering that the pitch of the pixels in a liquid-crystal cell is typically 100 to 300 μm, the stated viewpoint dictates that each plane of the shorter side is preferably formed to be no more than 40 μm, more preferably 1 to 20 μm, most preferably 5 to 15 μm, in size as calculated for the width of projection onto the reference plane defined by the bottom surface.

The above-stated viewpoint also dictates that the spacing between planes of the shorter side is preferably large. On the other hand, it should be remembered that the plane of the shorter side is in effect a functional element that allows for emergence of the light incident on a side of the light guide plate; if the spacing between planes of the shorter side is excessive, only limited illumination is produced from the light guide plate in ON state and the resulting display also looks unnatural. Considering these facts, the repeating pitch P of the prismatic asperities (ridges 2a or grooves 2b) shown in FIGS. 3A and 3B is preferably adjusted to lie in the range of 50 μm to 1.5 mm. The pitch may be constant or irregular as exemplified by a random pitch or random or regular combinations of a specified number of pitch units.

Ideally, the vertexes of the prismatic asperities, or the points at which the planes of the shorter side cross the planes of the longer side, are each formed as the crossing point of two planes. In practice, however, neither the planes of the shorter side nor those of the longer side can be formed as planes that have no surface roughness in the strict sense of the term and, for the same reason, the vertexes cannot be formed as the crossing points of planes but are formed to a certain degree of radius. However, the roundness of vertexes is a potential cause of increasing the angle of travel of the transmitted light or producing more leakage light.

Possible effects of these phenomena include, for example, the decrease in directivity in the aforementioned direction effective for viewing the light emerging from the bottom surface and the decrease in contrast due to the leakage light. The light guide plate is desirably protected from these effects. As regards the planes of the shorter side and those of the longer side, the effects can be suppressed by forming them as planes whose surface roughness has been reduced to achieve the highest possible degree of smoothness. As regards the effects of the roundness of vertexes, the roundness of two vertexes in the prismatic asperities formed by a plane of the shorter side and two planes of the longer side that are adjacent to the shorter plane is approximated by an arc of a circle and the sum of the radii of the two arcs of a circle is adjusted to be no more than a half, preferably no more than a third, of the side length of the plane of the shorter side in order to control the aforementioned effects of vertex roundness.

If the above-stated condition of the sum of radii is satisfied, the area of planes which are inclined at angles no more than 30 degrees to have the disadvantage of-being likely to increase the angle of travel and the leakage light by causing scattering similar to that occurred by the aforementioned diffusing dots or the like and abnormal reflections such as one at large angle, can be made sufficiently smaller than the area of the planes of the shorter side to suppress their adverse effects. The above-mentioned scattering and abnormal reflections also have something to do with the disturbance and other problems with the display image and by satisfying the above-stated condition of the sum of radii, such problems can also be prevented to improve the clarity and other elements of the display image.

Mainly from the viewpoint of preventing the disturbance of the display image due to the overall scattering characteristics of the light guide plate including the scattering due to the aforementioned roundness of vertexes and for producing a clear display image, a preferred light guide plate is such that normal incident light from the bottom surface passes through the top surface at a total ray transmission of at least 90% and with a haze of no more than 15%.

The light issuing means made up of prismatic asperities sometimes interfere with the pixels in the liquid-crystal cell to produce moiré. To prevent moiré, the pitch of the prismatic asperities need be adjusted; however, as already mentioned, the prismatic asperities have a preferred pitch range. The problem therefore is how to deal with the formation of moiré that occurs with the preferred pitch range.

For the purposes of the prevent invention, it is preferred to prevent moiré by forming the prismatic asperities at an angle with the reference plane defined by the entrance end surface such that they can be arranged in a crossed pattern with respect to the pixels. When adopting this approach, if the angle of inclination of the prismatic asperities is excessive, the reflection via the planes of the shorter side deviates to cause a substantial offset in the direction of emerging light and the intensity of light emission from the light guide plate in the direction of light travel becomes so much anisotropic that the efficiency of light utilization decreases to deteriorate the quality of the display.

From this viewpoint, the angle at which the direction of arrangement of the prismatic asperities is inclined with respect to the reference plane defined by the entrance side surface is preferably adjusted to lie within ±35 degrees, more preferably within ±30 degrees, most preferably ±25 degrees. The positive or negative sign represents the direction of inclination with reference to the entrance end surface. If moire is negligible, the prismatic asperities are preferably arranged in directions that have the highest degree of parallelism to the entrance end surface.

As already mentioned, the light guide plate may assume any suitable shapes. If it is shaped like a wedge, any appropriate shapes may be adopted, with the top surface being appropriately shaped, as exemplified by a straight surface indicated by 11 in FIG. 2A or curved surfaces indicated by 16 and 17 in FIGS. 2B and 2C, respectively.

The prismatic asperities forming the light issuing means also need not be formed of straight surfaces 21, 22 23 and 24 illustrated in FIGS. 3A and 3B but may be formed in any appropriate shapes including bent surfaces, curved surfaces and so forth. The prismatic asperities may comprise combinations of ridges and grooves that differ not only in pitch but also in other factors including shape.

Mainly from the viewpoint of preventing the production of a disturbed display image, the bottom surface of the light guide plate is preferably shaped to be flat enough to have the highest degree of smoothness but this is not the sole case of the invention. The shape of the entrance end surface also is not limited in any particular way and may be determined as appropriate. Generally, it is shaped as a plane perpendicular to the bottom surface but, if desired, it may assume an inwardly curved shape or any other shape that conforms to the perimeter or other factor of the light source, thereby improving the efficiency of light incidence. It is also possible for the entrance end surface to adopt a structure such as one having an introducing part that immediately follows the light source. The introducing part may assume any shape depending on the light source and others.

The light guide plate may be formed of any suitable materials that are transparent to the specific wavelength range of the light source used. With a light source emitting in the visible range, transparent resins typified by acrylic resins, polycarbonate resins, epoxy resins, etc., as well as glass may be mentioned as exemplary materials. The light guide plate formed of materials that show little or no birefringence is used with preference.

The light guide plate can be formed by any suitable methods including cutting. Methods of production that are preferred mainly from the viewpoint of allowing for mass production include: transferring a specified shape to a thermoplastic resin by pressing it under heating to a mold capable of forming that shape; heat melting a thermoplastic resin or fluidizing a resin either with heat or in the presence of a solvent and filling such resin into a mold capable of providing a specified shape; and preparing a liquid resin that can be polymerized with heat, ultraviolet radiation or other radiations, filling or casting the resin into a mold capable of forming a specified shape, and polymerizing the resin.

In the present invention, the light guide plate may typically be formed as a lamination of parts made of similar or dissimilar materials, as exemplified by a light guiding element that is responsible for optical transmission and to which is bonded a sheet having prismatic asperities or other light issuing means formed thereon. The light guide plate need not be formed as a unitary single layer made of one kind of material.

The thickness of the light guide plate can be determined at an appropriate value depending on the purpose of its use considering various factors including the size of the light guide plate and that of the light source. A typical thickness of the light guide plate for the case where it is used as a part of a reflection-type liquid-crystal display device and the like is no more than 5 mm, preferably 0.1 to 3 mm, more preferably 0.5 to 2 mm, in terms of the thickness at the entrance end surface.

Using the light guide plate of the invention, one can form various devices including a planer light source unit that allows precisely collimated light to emerge in a direction having high degree of perpendicularity that is advantageous for viewing, thereby achieving efficient utilization of the light from the light source to produce high brightness, as well as a reflection-type liquid-crystal display device that is bright, that features high contrast and that consumes less power.

Figure 5:
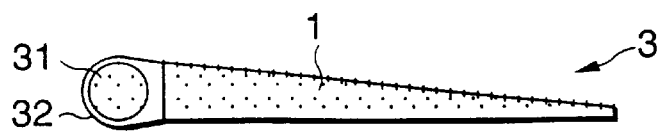
FIG. 5 is a side sectional view of a planer light source unit.

FIG. 5 illustrates a planer light source unit 3 having a light guide plate 1 according to the invention. As shown, the planer light source unit 3 can be formed by positioning a light source 31 adjacent the entrance end surface of the light guide plate 1 and it is preferably used typically as a front light of sidelight type.

Any appropriate light source may be positioned adjacent the entrance end surface of the light guide plate. Typical examples that can be used with preference include linear light sources such as (cold or hot) cathode-ray tubes, point light sources such as a light-emitting diode, linear or planar arrays of such point light sources, and light sources that use a device for converting point light sources such that they are capable of linear emission at constant or varying intervals. Mainly from the viewpoint of lower power consumption and high durability, cold cathode-ray tubes are particularly preferred.

Figure 6:
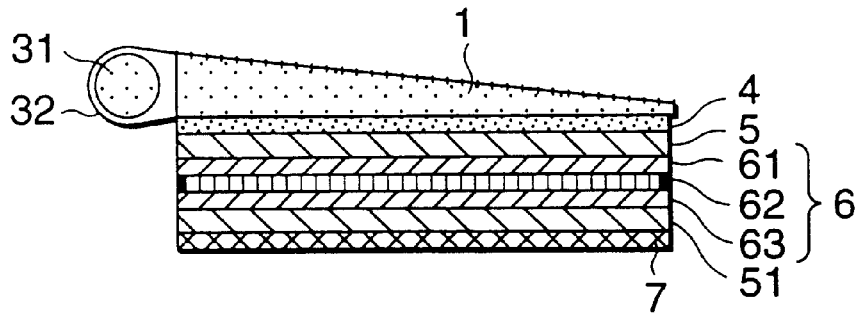
FIG. 6 is a side sectional view of a reflection-type liquid-crystal display device.

If necessary, the planer light source unit may be formed as an assembly with an appropriate auxiliary means such as a light source holder which is indicated by 32 in FIG. 5 and which surrounds the light source 31 so as to ensure that the divergent light from the light source is directed to the entrance end surface of the light guide plate 1 or a diffusing layer which is indicated by 4 in FIG. 6 and which is placed underneath the bottom surface of the light guide plate so as to produce uniform surface emission.

The light source holder is typically formed of a resin sheet furnished with a high-reflectance thin metal film, a metal foil or the like. If the light source holder is to be bonded to an end of the light guide plate via an adhesive or the like, it is not absolutely necessary to form a light issuing means at the joint.

The diffusing layer is an optional element that is preliminarily positioned beneath the light exit face of the planer light source unit, namely the bottom surface 12 of the light guide plate 1 for various purposes such as preventing the unevenness in light and dark areas so as to provide uniform brightness and reducing the moiré due to the intermingling of adjacent rays of light. In the present invention, a diffusing layer permitting a narrow range of diffusion is preferably used mainly from the viewpoint of maintaining the directivity of the light emerging from the light guide plate and achieving efficient utilization of light.

The diffusing layer can be formed by any appropriate methods and examples include: dispersing clear particles of high refractive index within a clear resin of low refractive index, applying a coating of the resin and curing the same; dispersing air bubbles within a clear resin, applying a coating of the resin and curing the same; swelling a substrate surface in the presence of a solvent so as to produce crazes; forming a clear resin layer having irregular surface asperities; and using a diffusing sheet formed by any of the methods described above. In short, there is no particular limitation on the method of forming the diffusing layer.

The above-mentioned irregular surface asperities may be formed by any appropriate methods including mechanical and/or chemical methods by which the surface texture of a roll, a mold or the like that have been grained on the surface is transferred to the surface of a substrate or an overlying coated layer of a clear resin. The aforementioned clear particles may be selected from appropriate materials including, for example, optionally conductive, inorganic particles with an average size of 0.5 to 100 $\mu$m as exemplified by those of silica, alumina, titania, zirconia, tin oxide, indium oxide, cadmium oxide and antimony oxide, and organic particles as exemplified by those of crosslinked or uncrosslinked polymers.

As described above, the planer light source unit according to the invention features highly efficient light utilization, is bright and provides light that has high degree of perpendicularity, with an additional advantage that it can be formed in a large area. Hence, it can be applied with preference to various devices, typically as a front light system in a reflection-type liquid-crystal display device and the like; using this planer light source unit, one can produce a bright, high-contrast and low-power-consumption reflection-type liquid-crystal display device and the like.

Figure 7:
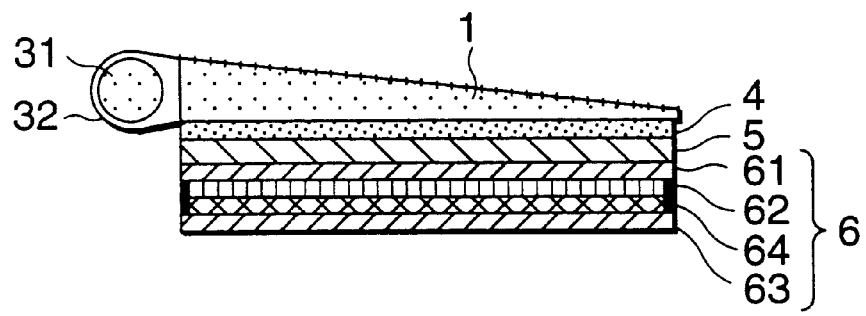
FIG. 7 is a side sectional view of another reflection-type liquid-crystal display device.

FIGS. 6 and 7 illustrate two examples of a reflection-type liquid-crystal display device using the planer light source unit 3 of the invention as a front light system. Indicated by 5 and 51 is a polarizer plate, 6 is a liquid-crystal cell, 61 and 63 are each a cell substrate, 62 is a liquid-crystal layer, and 7 and 64 are each a reflective layer. As shown, the liquid-crystal cell 6 furnished with the reflective layer 7 or 64 is positioned beneath the light exit side of the planer light source unit, namely, beneath of the bottom surface of the light guide plat 1 in the planer light source unit and this is how the reflection-type liquid-crystal display device is formed.

The reflection-type liquid-crystal display device is typically formed by assembling in an appropriate manner various components such as a liquid-crystal cell furnished with transparent electrodes serving as liquid-crystal switches, ancillary drive units, polarizer plates, a front light, a reflective layer and an optional compensating phase-difference plate. The present invention is not limited in any particular way except for the use of the above-described planer light source unit and the desired reflection-type liquid-crystal display device can be formed in the conventional manner as shown in FIGS. 6 and 7. It should be noted that transparent electrodes are not shown in these drawings.

As will be understood from the above, the liquid-crystal cell to be used is not limited to any particular type and, in terms of the mode of molecular orientation in liquid crystals, any appropriate twisted, non-twisted, guest-host and ferroelectric liquid-crystal cells may be used, as exemplified by TN liquid-crystal cell, STN liquid-crystal cell, normal oriented cell, HAN cell and OCB cell. The method of driving liquid crystals also is not limited in any particular way and any appropriate drive systems may be employed, as exemplified by an active matrix system and a passive matrix system.

The reflection-type liquid-crystal display device requires the reflective layer 7 or 64 as an essential component and it may be provided outside the liquid-crystal cell 6 as illustrated in FIG. 6 or inside it as shown in FIG. 7. Any appropriate reflective layer may be formed as in the conventional art and examples include: a coating layer having the particles of high-reflectance metals such as aluminum, silver, gold, copper and chromium incorporated in a binder resin; a deposited layer of a thin metal film typically formed by evaporation; a reflective sheet having the above-described coating layer or deposited layer supported on a substrate; and a metal foil.

If the reflective layer is to be provided inside the liquid-crystal cell 6 as indicated by 64 in FIG. 7, it is preferably a highly conductive material as exemplified by the aforementioned high-reflectance metals rather than a transparent conductive film or the like that may be made of a conventional transparent electrode forming material.

The polarizer plates may also be of any appropriate types; however, mainly from the viewpoint of producing a display of satisfactory contrast ratio by assuring the incidence of highly linearly polarized light, plates capable of high degree of polarization as exemplified by iodine- or dye-based absorptive linear polrizers are preferably used.

When forming the reflection-type liquid-crystal display device, any appropriate optical elements may be provided in appropriate positions, as exemplified by a diffusing plate, an anti-glare layer, an anti-reflection layer and a protective layer that are provided on the polarizer plate on the viewing side, or a compensating phase-difference plate that is provided between the liquid-crystal cell and the polarizer plate.

The compensating phase-difference plate is typically intended to assure better visibility by compensating the wavelength dependency of birefringence and the like. In the present invention, this plate is optionally provided as between the polarizer plate either on the viewing side or on the back side and the liquid-crystal cell. If necessary, the plate may be provided both between the polarizer plate on the viewing side and the liquid-crystal cell and between the polarizer plate on the back side and the liquid-crystal cell.

Any appropriate compensating phase-difference plate may be used depending on the wavelength range and the like and it may be formed as a single phase-difference layer or as an assembly of two or more superposed phase-difference layers.

Figure 8:
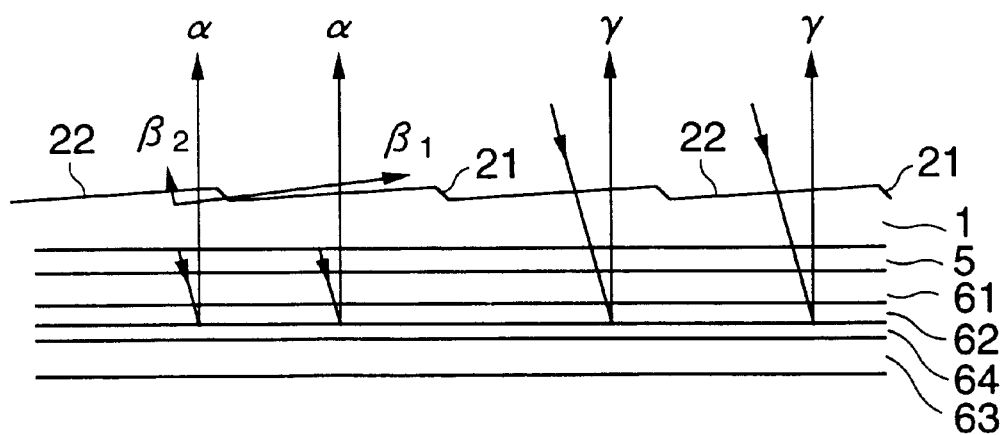
FIG. 8 is an illustration of the display image according to the present invention.
Figure 9:
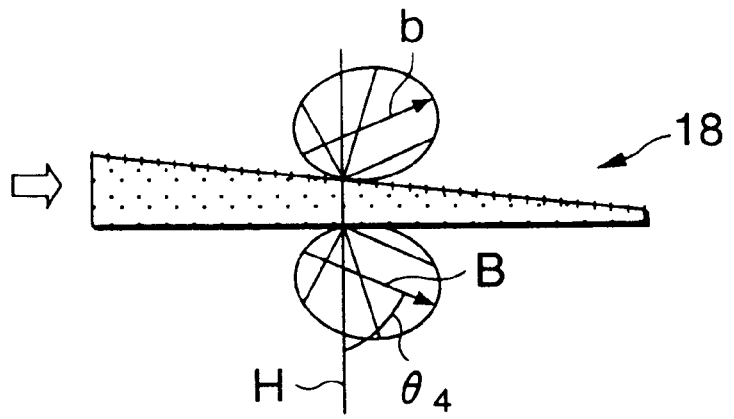
FIG. 9 is a diagram illustrating the exit characteristics obtained in the related art.
Figure 10:
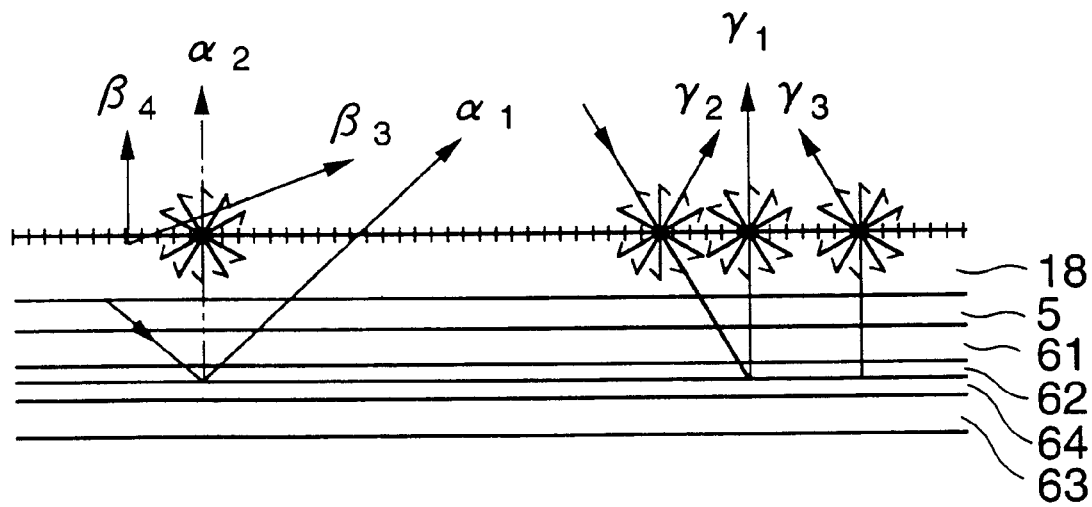
FIG. 10 is an illustration of the display image produced in the related art.

The reflection-type liquid-crystal display device according to the invention is viewed via the light from the planer light source unit, particularly via the light transmitted through the planes of the longer side on the light guide plate. FIG. 8 illustrates how the device is viewed in the case where the reflective layer 64 is provided within the liquid-crystal cell. As shown, when the planer light source unit is ON, the light a emerging from the bottom surface of the light guide plate 1 passes through the polarizer plate 5, liquid-crystal layer 62 and so forth to be reflected by the reflective layer 64; the reflected light travels back in the path including the liquid-crystal layer, the polarizer plate and so forth until it reaches the light guide plate 1, where it is transmitted through the planes of the longer side 22 to allow for the viewing of the display image ($\alpha$).

In the case just described above, according to the present invention, intense leakage light $\beta_1$ emerges in a direction offset by a substantial angle from the front direction normal to the liquid-crystal cell. On the other hand, only weak leakage light $\beta_2$ emerges in the front direction. Therefore, one can view a display image of high display quality via the planes of the longer side at angles near the front direction.

When the planer light source unit is OFF and uses extraneous light, the light $\gamma$ incident on the planes of the longer side 22 on the light guide plate travels forward and backward in the path including the polarizer plate, liquid-crystal layer, reflective layer and so forth in the same manner described above until it reaches the light guide plate 1 and a display image ($\gamma$) that has passed through the planes of the longer side can be viewed at angles near the front direction as one of high display quality that is less affected by disturbances and other adverse effects of the light guide plate.

In the present invention, the light guide plate and optical elements or parts such as a diffusing layer, a liquid-crystal cell and polarizer plates that compose the planer light source unit and the liquid-crystal display device may be secured one to another either entirely or partly as an integral assembly of superposed layers; alternatively, the individual components may be positioned in an easily separable state. Mainly from the viewpoint of preventing the decrease in contrast by controlling interfacial reflection, the components are preferably secured one to another and it is more preferred that at least the bottom surface of the light guide plate in the planer light source unit and the top surface of the liquid-crystal cell are secured to have intimate contact with each other.

To secure individual components to have an intimate contact with each other, an appropriate clear adhesive such as self-adhesives may be used and the resulting clear adhesive layer may incorporate the aforementioned clear particles and the like to form an adhesive layer or the like that exhibits a diffusing capability.

EXAMPLES

Example 1

A clear polymethyl methacrylate (PMMA) plate is cut on one side with a diamond cutting tool to form a light guide plate of the following specifications: width, 80 mm; depth, 130 mm; thickness at the entrance end surface, 2 mm;

thickness at the opposed end, 0.8 mm; bottom surface (exit face), flat; top surface, a curved surface projecting upward but substantially flat in the area extending from the entrance end surface to the opposed end (see FIG. 2B), with prismatic asperities formed parallel to the entrance end surface on a pitch of 390 μm; planes of the shorter side, inclined at angles varying within the range of 36.5 to 39 degrees; planes of the longer side, inclined at angles varying within the range of 1.1 to 1.5 degrees; the variation in the angle of inclination between a plane of the longer side and the nearest plane of the longer side, within 0.1 degree; the width of a plane of the shorter side as projected onto the bottom surface, 10 to 21 μm; and the ratio between the area of a plane of the shorter side as projected onto the bottom surface and the similar projected area of a plane of the longer side, no more than 1/17. The prismatic asperities were not formed immediately adjacent the entrance end surface but starting in a position 2 mm away from it.

A cold cathode-ray tube 2.4 mm in diameter was positioned adjacent the entrance end surface of the thus prepared light guide plate and a light source holder made of a polyester film having an evaporated silver coating was placed around the cathode-ray tube, with the edges being secured to the top and bottom end faces of the light guide plate. An inverter and a dc power source were connected to the cathode-ray tube to construct a planer light source unit. On the light exit side of the planer light source unit was provided a monochromatic reflection-type TN liquid-crystal cell having on the back side a reflective sheet prepared in the same manner as the light source holder. Thus fabricated was a reflection-type liquid-crystal display device. The planer light source unit could be set in either ON or OFF state by turning the power source on or off, respectively. In the liquid-crystal display device, all pixels could be turned on or off by manipulating the drive source.

Example 2

A wedge-shaped light guide plate having the following specifications was formed in accordance with Example 1: width, 80 mm; depth, 130 mm; thickness at the entrance end surface, 1.5 mm; thickness at the opposed end, 1.0 mm; bottom surface, flat; top surface, flat and having prismatic asperities formed parallel to the entrance end surface on a pitch of 500 μm; planes of the shorter side, inclined at angles varying within the range of 37.7 to 38.9 degrees; planes of the longer side, inclined at angles varying within the range of 0.6 to 1.1 degrees; the variation in the angle of inclination between a plane of the longer side and the nearest plane of the longer side, within 0.1 degree; the width of a plane of the shorter side as projected onto the bottom surface, 10 to 14 μm; and the ratio between the area of plane of the shorter side as projected onto the bottom surface and the similar projected area of a plane of the longer side, no more than 1/35. Using this light guide plate, a planer light source unit and a reflection-type liquid-crystal display device were fabricated. The prismatic asperities were not formed immediately adjacent the entrance end surface but starting in a position 2 mm away from it.

Example 3

A light guideplate was formed in accordance with Example 2, except for the following points; the pitch of the prismatic asperities was 500 μm; the angle of inclination of the planes of the shorter side was 38.3 degrees; the angle of inclination of the planes of the longer side was 0.7 degrees (the variation in the angle of inclination between a plane of the longer side and the nearest plane of the longer side was substantially zero and within 0.1 degree); the width of a plane of the shorter side as projected onto the bottom surface was 10 μm; and the ratio between the area of a plane of the shorter side as projected onto the bottom surface and the similar projected area of a plane of the longer side was 1/49. Using this light guide plate, a planer light source unit and a reflection-type liquid-crystal display device were fabricated.

Example 4

In accordance with Example 1, a light guide plate was formed from a flat plate of uniform thickness that was 80 mm wide, 130 mm deep and 1.5 mm thick at both the entrance end surface and the opposed end. On one of its sides, the plate had prismatic asperities that were formed parallel to the entrance end surface on a pitch of 500 μm. The angle of inclination of the planes of the shorter side was 38.3 degrees; the angle of inclination of the planes of the longer side was 0.9 degrees (the variation in the angle of inclination between a plane of the longer side and the nearest plane of the longer side was substantially zero and within 0.1 degree); the width of a plane of the shorter side as projected onto the bottom surface was 10 μm; and the ratio between the area of a plane of the shorter side as projected onto the bottom surface and the similar projected area of a plane of the longer side was 1/49. Using this light guide plate, a planer light source and a reflection-type liquid-crystal display device were fabricated. The prismatic asperities were not formed immediately adjacent the entrance end surface but starting in a position 2 mm away from it.

Example 5

A light guide plate having the following specifications was formed in accordance with Example 1: width, 80 mm; depth, 63 mm; thickness at the entrance end surface, 2 mm; thickness at the opposed end, 0.8 mm; bottom surface, flat; top surface, a curved surface projecting upward but substantially flat in the area extending from the entrance end surface to the opposed end, with prismatic asperities formed parallel to the entrance end surface on a pitch of 160 μm; planes of the shorter side, inclined at angles varying within the range of 40.5 to 43.5 degrees; planes of the longer side, inclined at angles varying within the range of 1.8 to 4.9 degrees; the variation in the angle of inclination between a plane of the longer side and the nearest plane of the longer side, within 0.1 degree; the width of a plane of the shorter side as projected onto the bottom surface, 10.7 to 21.1 μm; and the ratio between the area of a plane of the shorter side as projected onto the bottom surface and the similar projected area of a plane of the longer side, no more than 1/6. Using this light guide plate, a planer light source unit and a reflection-type liquid-crystal display device were fabricated. The prismatic asperities were not -formed immediately adjacent the entrance end surface but starting in a position 3 mm away from it.

Example 6

A light guide plate having the following specifications was formed in accordance with Example 1: width, 80 mm; depth, 63 mm; thickness at the entrance end surface, 2 mm; thickness at the opposed end, 0.8 mm; bottom surface, flat; top surface, a curved surface projecting upward but substantially flat in the area extending from the entrance end surface to the opposed end; with prismatic asperities formed parallel to the entrance end surface on a pitch of 200 μm; planes of the shorter side, inclined at angles varying within the range of 39.1 to 41.9 degrees; planes of the longer side, inclined at angles varying within the range of 2.5 to 3.6 degrees; the variation in the angle of inclination between a plane of the longer side and the nearest plane of the longer side, within 0.1 degree; the width of a plane of the shorter side as projected onto the bottom surface, 10 to 22.3 µm; and the ratio between the area of a plane of the shorter side as projected onto the bottom surface and the similar projected area of a plane of the longer side, no more than 1/7. Using this light guide plate, a planer light source unit and a reflection-type liquid-crystal display device were fabricated. The prismatic asperities were not -formed immediately adjacent the entrance end surface but starting in a position 3 mm away from it.

Example 7

A mold was prepared such that it could form a light guide plate of the same shape and dimensions as the plate formed in Example 5. The mold was heated to 100° C. and filled with a heat melted mass of PMMA, thereby forming a light guide plate. Using this light guide plate, a planer light source unit and a reflection-type liquid-crystal display device were fabricated.

Example 8

By a mold-using technique in accordance with Example 7, a molded plate having the following specifications was formed: width, 230 mm; depth, 190 mm; thickness at the entrance end surface; 2.6 mm; thickness at the opposed end, 0.8 mm; bottom surface, flat; and top surface, a curved surface projecting upward but substantially flat in the area extending from the entrance end surface to the opposed end, with prismatic asperities formed parallel to the entrance end surface. The molded plate was then cut to have the prismatic asperities crossing the entrance end surface, thereby forming a light guide plate having the following specifications: width, 80 mm; depth, 63 mm; thickness at the entrance end surface, 2 mm; thickness at the opposed end, 1 mm; top surface, having prismatic asperities formed on a pitch of 300 µm and arranged at a cross angle of 25 degrees with the entrance end surface; planes of the shorter side, inclined at angles varying within the range of 40.6 to 41.6 degrees; planes of the longer side, inclined at angles varying within the range of 0.9 to 1.6 degrees; the variation in the angle of inclination between a plane of the longer side and the nearest plane of the longer side, within 0.1 degree; the width of a plane of the shorter side as projected onto the bottom surface, 12.5 to 14.5 µm; and the ratio between the area of a plane of the shorter side as projected onto the bottom surface and the similar projected area of a plane of the longer side, no more than 1/20. Using this light guide plate, a planer light source unit and a reflection-type liquid-crystal display device were fabricated in accordance with Example 1. The prismatic asperities were not formed immediately adjacent the entrance end surface but starting in a position 2 mm away from it.

Comparative Example 1

Using a commercial light guide plate, a planer light source unit and a reflection-type liquid-crystal display device were fabricated. The light guide plate was wedge-shaped and had a thickness of 155 mm, a depth of 60 mm, a thickness of 2 mm at the entrance end surface, and a thickness of 1 mm at the opposed end. It had a circular dot pattern on one side that was made up of randomly distributed ridges and grooves formed by embossing.

Comparative Example 2

Using another commercial light guide plate, a planer light source unit and a reflection-type liquid-crystal display device were fabricated in accordance with Example 1. The light guide plate was wedge-shaped and had a thickness of 238 mm, a depth of 178 m, a thickness of 3 mm at the entrance end surface, and a thickness of 1.5 mm at the opposed end. It had white dots printed on one side in such a way that they were generally square on the side closer to the entrance end surface but changed to rectangles in the area closer to the opposed end than to the center, with the dot area increasing toward the opposed end.

Comparative Example 3

A light guide plate having the following specifications was formed in accordance with Example 1: width, 80 mm; depth, 63 mm; thickness at the entrance end surface, 2 mm; thickness at the opposed end, 0.8 mm; bottom surface, flat; top surface, a curved surface projecting upward but substantially flat in the area extending from the entrance end surface to the opposed end, with prismatic asperities formed parallel to the entrance end surface on a pitch of 160 µm; planes of the shorter side, inclined at angles varying within the range of 40.1 to 43.2 degrees; planes of the longer side, inclined at angles varying within the range of 9.5 to 12.8 degrees; the variation in the angle of inclination between a plane of the longer side and the nearest plane of the longer side, within 0.2 degree; the width of a plane of the shorter side as projected onto the bottom surface, 30 to 43 µm; and the ratio between the area of a plane of the shorter side as projected onto the bottom surface and the similar projected area of a plane of the longer side, 1/2.9 to 1/4.3. Using the light guide plate, a planer light source unit and a reflection-type liquid-crystal display device were fabricated. The prismatic asperities were not formed immediately adjacent the entrance end surface but starting in a position 3 mm away from it.

Comparative Example 4

A light guide plate having the following specifications was formed in accordance with Example 1: width, 80 mm; depth, 63 mm; thickness at the entrance end surface, 2 mm; thickness at the opposed end, 0.8 mm; bottom surface, flat; top surface, a curved surface projecting upward but substantially flat in the area extending from the entrance end surface to the opposed end, with prismatic asperities formed parallel to the entrance end surface on a pitch of 160 µm; planes of the shorter side, inclined at angles varying within the range of 28.8 to 29.3 degrees; planes of the longer side, inclined at angles varying within the range of 0.1 to 3.6 degrees; the variation in the angle of inclination between a plane of the longer side and the nearest plane of the longer side, within 0.1 degree; the width of a plane of the shorter side as projected onto the bottom surface, 10.7 to 21.1 µm; and the ratio between the area of a plane of the shorter side as projected onto the bottom surface and the similar projected area of a plane of the longer side, no more than 1/6. Using this light guide plate, a planer light source unit and a reflection-type liquid-crystal display device were fabricated. The prismatic asperities were not formed immediately adjacent the entrance end surface but starting in a position 3 mm away from it.

Comparative Example 5

A light guide plate having the following specifications was formed in accordance with Example 1: width, 80 mm;

depth, 63 mm; thickness at the entrance end surface, 2 mm; thickness at the opposed end, 0.8 mm; bottom surface, flat; top surface, a curved surface projecting upward but substantially flat in the area extending from the entrance end surface to the opposed end, with prismatic asperities formed parallel to the entrance end surface on a pitch of 160 μm; planes of the shorter side, inclined at angles varying within the range from about 40 to about 42 degrees; planes of the longer side, inclined at angles varying within the range from about 1 to about 10 degrees; the variation in the angle of inclination between a plane of the longer side and the nearest plane of the longer side, at least 1 degree in terms of the changes in the length and height of a plane of the shorter side; the width of a plane of the shorter side as projected onto the bottom surface, from about 10 to about 40 μm; and the ratio between the area of a plane of the shorter side as projected onto the bottom surface and the similar projected area of a plane of the longer side, about ¼. Using this light guide plate, a planer light source unit and a reflection-type liquid-crystal display device were fabricated. The prismatic asperities were not formed immediately adjacent the entrance end surface but starting in a position 3 mm away from it.

Comparative Example 6

A light guide plate having the following specifications was formed in accordance with Example 1: width, 80 mm; depth, 130 mm; thickness at the entrance end surface, 1.5 mm; thickness at the opposed end, 1 mm; bottom surface, flat; top surface, flat and having prismatic asperities formed parallel to the entrance end surface on a pitch of 2 mm; planes of the shorter side, inclined at an angle of 38.7 degrees; planes of the longer side, inclined at an angle of zero degrees; the variation in the angle of inclination between a plane of the longer side and the nearest plane of the longer side, within 0.1 degree; the width of a plane of the shorter side as projected onto the bottom surface, 10 μm; and the ratio between the area of a plane of the shorter side as projected onto the bottom surface and the similar projected area of a plane of the longer side, ¹⁄₁₉₉. Using the light guide plate, a planer light source unit and a reflection-type liquid-crystal display device were fabricated. The prismatic asperities were not formed immediately adjacent the entrance end surface but starting in a position 2 mm away from it.

Comparative Example 7

Using a mold heated at 90° C., the technique of Example 7 was employed to form a light guide plate having the following specifications: width, 80 mm; depth, 63 mm; thickness at the entrance end surface, 2.0 mm; thickness at the opposed end, 0.8 mm; bottom surface flat; top surface, a curved surface projecting upward but substantially flat in the area extending from the entrance end surface to the opposed end, with prismatic asperities formed parallel to the entrance end surface on a pitch of 160 μm; planes of the shorter side, inclined at angles varying within the range of 40.6 to 43.5 degrees; planes of the longer side, inclined at angles varying within the range of 1.8 to 4.9 degrees; the variation in the angle of inclination between a plane of the longer side and the nearest plane of the longer side, within 0.1 degree; the width of a plane of the shorter side as projected onto the bottom surface, 10.7 to 21.1 μm; and the ratio between the area of a plane of the shorter side as projected onto the bottom surface and the similar projected area of a plane of the longer side, no more than ⅙. Using the light guide plate, a planer light source unit and a reflection-type liquid-crystal display device were fabricated in accordance with Example 1. The prismatic asperities were not formed immediately adjacent the entrance end surface but starting in a position 3 mm away from it.

Comparative Example 8

A light guide plate was formed in accordance with Example 8, except that the prismatic asperities were arranged at a cross angle of 40 degrees with the entrance end surface. Using the light guide plate, a planer light source unit and a reflection-type liquid-crystal display device were fabricated.

EVALUATION TESTS

The light guide plates, planer light source units and reflection-type liquid-crystal display devices fabricated in Examples 1 to 8 and Comparative Examples 1 to 8 were checked for the following characteristics. Intensity of emerging light, or exit intensity:

With the planer light source unit turned on, the angular characteristics of the intensity of the light emerging from the top and bottom surfaces in the central area of the light guide plate were investigated with a brightness meter (BM7 of Thompson). The measurement was performed with the angle being varied from the line normal to the bottom surface in a plane perpendicular to both the bottom surface and the entrance end surface. To assure a constant area of measurement, each of the measurements was multiplied by the cosine of the angle of measurement θ and the intensity of the emerging light at θ was determined. The direction in which a maximum intensity of light emergence occurred was also determined.

The thus obtained data on the maximum intensity on the bottom surface, its direction, as well as the intensity of emerging light from the top surface in a direction of mirror symmetry with the direction of maximum intensity on the bottom surface with respect to the normal line and the bottom surface (said intensity is hereinafter called "corresponding exit intensity") are shown in Tables 1 and 2. The data on the front (normal direction) exit intensity on the top and bottom surfaces, as well as the front/maximum intensity ratio on the bottom surface are also shown in Tables 3 and 4.

Quantity of light within a solid angle of 30°:

A cylindrical body having a hole 10 mm in diameter and which was painted black on the inner surfaces to give a matte finish was installed in a face-to-face relationship with an illuminometer such that the solid angle formed between the hole and the light-receiving plane of the illuminometer was 30 degrees. Using the assembly, the quantity of light emerging from the top and bottom surfaces of the planer light source unit in ON state at solid angles within 30 degrees was measured. The result is shown in Tables 5 and 6, which also show the percent total ray transmission through the light guide plate and the haze.

Front luminance:

With the reflection-type liquid-crystal display device in a driven state, the front luminances in both a white state and a black state were measured with the planer light source unit held in On state. The result is shown in Tables 7 and 8. Front luminances were also measured without providing the planer light source unit and the result is shown as "Reference Example" in Table 8.

Vertex characteristics:

For the prismatic asperities on the light-guide plates formed in Example 7 and Comparative Example 7, the side length of a plane of the shorter side, as well as the roundness of the vertexes of a ridge and a groove formed by a plane of the shorter side and an adjacent plane of the longer side were measured. In Example 7, the side length of a plane of the shorter side was 12.6 μm; the approximated radius of the vertex formed by a plane of the shorter side and an adjacent plane of the longer side was 3 μm at a ridge and 1 μm at a groove; hence, the ratio of the sum of two radii to the side length was 0.317.

In Comparative Example 7, the side length of a plane of the shorter side was 12.4 μm; the approximated radius of the vertex formed by a plane of the shorter side and an adjacent plane of the longer side was 5.5 μm at a ridge and 1.5 μm at a groove; hence, the ratio of the sum of two radii to the side length was 0.565.

TABLE 1

| | Angle of maximum intensity on bottom surface (deg) | Maximum intensity on bottom surface = M (cd/m$^2$) | Corresponding exit intensity on top surface = C (cd/m$^2$) | C/M |
|---|---|---|---|---|
| Example 1 | 16 | 680 | 34 | 0.050 |
| Example 2 | 19 | 475 | 22 | 0.046 |
| Example 3 | 18 | 460 | 19 | 0.041 |
| Example 4 | 18 | 443 | 15 | 0.034 |
| Example 5 | 8 | 1230 | 59 | 0.048 |
| Example 6 | 15 | 1180 | 52 | 0.044 |
| Example 7 | 12 | 1120 | 92 | 0.082 |
| Example 8 | 18 | 810 | 87 | 0.107 |
| Comparative Example 1 | 70 | 540 | 470 | 0.870 |
| Comparative Example 2 | 45 | 250 | 220 | 0.880 |

TABLE 2

| | Angle of maximum intensity on bottom surface (deg) | Maximum intensity on bottom surface = M (cd/m$^2$) | Corresponding exit intensity on top surface = C (cd/m$^2$) | C/M |
|---|---|---|---|---|
| Comparative Example 3 | 8 | 410 | 37 | 0.090 |
| Comparative Example 4 | 50 | 1190 | 430 | 0.361 |
| Comparative Example 5 | 9 | 1040 | 48 | 0.047 |
| Comparative Example 6 | 16 | 138 | 16 | 9.116 |
| Comparative Example 7 | 19 | 710 | 150 | 0.211 |
| Comparative Example 8 | 22 | 600 | 73 | 0.122 |

TABLE 3

| | Front exit intensity (cd/m$^2$) | | Front/maximum intensity ratio on bottom surface |
|---|---|---|---|
| | on bottom surface | on top surface | |
| Example 1 | 104 | 18 | 0.153 |
| Example 2 | 68 | 15 | 0.143 |
| Example 3 | 67 | 11 | 0.146 |
| Example 4 | 62 | 12 | 0.14 |
| Example 5 | 560 | 34 | 0.455 |
| Example 6 | 225 | 29 | 0.191 |
| Example 7 | 545 | 46 | 0.487 |
| Example 8 | 235 | 41 | 0.29 |
| Comparative Example 1 | 21 | 16 | 0.039 |
| Comparative Example 2 | 155 | 90 | 0.62 |

TABLE 4

| | Front exit intensity (cd/m$^2$) | | Front/maximum intensity ratio on bottom surface |
|---|---|---|---|
| | on bottom surface | on top surface | |
| Comparative Example 3 | 220 | 29 | 0.537 |
| Comparative Example 4 | 58 | 20 | 0.049 |
| Comparative Example 5 | 470 | 28 | 0.452 |
| Comparative Example 6 | 23 | 12 | 0.167 |
| Comparative Example 7 | 360 | 58 | 0.507 |
| Comparative Example 8 | 180 | 39 | 0.3 |

TABLE 5

| | Quantity of light within a solid angle of 30° (LX) | | Ratio of light on top surface to light on bottom surface | Total ray transmission (%) | Haze (%) |
|---|---|---|---|---|---|
| | on bottom surface | on top surface | | | |
| Example 1 | 14.5 | 1.3 | 0.09 | 92.4 | 7.4 |
| Example 2 | 9.9 | 0.9 | 0.091 | 92.5 | 6.2 |
| Example 3 | 9.7 | 0.8 | 0.082 | 92.7 | 6.5 |
| Example 4 | 9.7 | 0.9 | 0.093 | 92.6 | 6.4 |
| Example 5 | 28.5 | 2.7 | 0.095 | 92.5 | 10.1 |
| Example 6 | 29.8 | 3.0 | 0.101 | 92.4 | 9.9 |
| Example 7 | 26.4 | 3.1 | 0.117 | 92.3 | 11.3 |
| Example 8 | 18.3 | 2.2 | 0.12 | 92.5 | 8.7 |
| Comparative Example 1 | 0.9 | 0.9 | 1.0 | 92.1 | 16.0 |
| Comparative Example 2 | 2.5 | 2.1 | 0.84 | 85.1 | 48.4 |

TABLE 6

| | Quantity of light within a solid angle of 30° (LX) | | Ratio of light on top surface to light on bottom surface | Total ray transmission (%) | Haze (%) |
|---|---|---|---|---|---|
| | on bottom surface | on top surface | | | |
| Comparative Example 3 | 13.6 | 1.8 | 0.132 | 88.9 | 24.3 |
| Comparative Example 4 | 11.4 | 1.3 | 0.114 | 92.5 | 8.7 |
| Comparative Example 5 | 23.7 | 2.8 | 0.118 | 92.2 | 11.2 |
| Comparative Example 6 | 3.0 | 0.7 | 0.233 | 92.7 | 3.5 |

TABLE 6-continued

| | Quantity of light within a solid angle of 30° (LX) | | Ratio of light on top surface to light on bottom surface | Total ray transmission (%) | Haze (%) |
|---|---|---|---|---|---|
| | on bottom surface | on top surface | | | |
| Comparative Example 7 | 17.4 | 2.2 | 0.126 | 92.4 | 11.7 |
| Comparative Example 8 | 14.3 | 1.3 | 0.091 | 92.5 | 8.9 |

TABLE 7

| | Front Luminance (cd/m$^2$) | | |
|---|---|---|---|
| | in white state | in black state | white/black ratio |
| Example 1 | 170 | 22 | 7.7 |
| Example 2 | 137 | 16 | 8.6 |
| Example 3 | 129 | 13 | 9.9 |
| Example 4 | 121 | 12 | 10.1 |
| Example 5 | 305 | 37 | 8.2 |
| Example 6 | 335 | 34 | 9.9 |
| Example 7 | 274 | 43 | 6.4 |
| Example 8 | 205 | 40 | 5.1 |
| Comparative Example 1 | 74 | 19 | 2.9 |
| Comparative Example 2 | 115 | 85 | 1.4 |
| Comparative Example 3 | 102 | 30 | 3.4 |

TABLE 8

| | Front luminance (cd/m$^2$) in ON state | | |
|---|---|---|---|
| | in white state | in black state | white/black ratio |
| Comparative Example 4 | 101 | 27 | 3.7 |
| Comparative Example 5 | 265 | 32 | 8.3 |
| Comparative Example 6 | 48 | 13 | 2.7 |
| Comparative Example 7 | 210 | 65 | 3.2 |
| Comparative Example 8 | 175 | 43 | 4.1 |
| Reference Example | 28 | 1.6 | 17.5 |

A comparison between Example 5 and Comparative Example 3 shows that when the light guide plate was assembled into a reflection-type liquid-crystal display device, the display was bright near the entrance end surface of the light guide plate of Comparative Example 3 but its brightness decreased sharply toward the opposed end. On the other hand, the light guide plate of Example 5 was substantially free from the change in luminance and featured high uniformity in brightness. In the light guide plate of Example 5, the planes of the shorter side in the light issuing means were hardly recognizable; however, in the light guide plate of Comparative Example 3, the planes of the shorter side were clearly visible.

A comparison between Example 5 and Comparative Example 4 shows that due to the difference in the angle of inclination of the planes of the shorter side, intense light emerged from the light guide plate of Comparative Example 4 in a direction offset by a substantial angle from the front direction and a marked drop occurred in luminance when the light guide plate was assembled into a reflection-type liquid-crystal display device. This caused a corresponding drop in contrast ratio compared to the value attained in Example 5.

A comparison between Example 3 and Comparative Example 6 shows that in Comparative Example 6 in which the angle of inclination of the planes of the longer side was set at zero degrees, the pitch of the prismatic asperities had to be increased to 2 mm; as a result, the bright-line emission from the light guide plate was clearly visible even by the reflection that occurred when it was assembled into a reflection type liquid-crystal display device; hence, the display quality decreased markedly, so did luminance.

A comparison between Example 7 and Comparative Example 7 shows that the difference that developed in their optical characteristics was due to the roundness of vertexes since the two light guide plates that were formed with the same mold did not have any differences in their basic shape and dimensions. As stated above, the light guide plate of Example 7 satisfied the condition of the present invention for the roundness of vertexes. However, the light guide plate of Comparative Example 7 did not satisfy the condition and the reflection-type liquid-crystal display device incorporating that light guide plate was dark and projected only low contrast.

Speaking of the viewing OFF state with the light guide plate positioned on the liquid-crystal cell, the linear pattern displayed on the liquid-crystal cell was clearly visible in Examples 1 to 8 and comparative Examples 4, 6, 7 and 8. On the other hand, the intended linear pattern was hardly recognizable due to scattering in Comparative Examples 1 and 2. In Comparative Example 3, the image was greatly displaced downward and looked darker than in Example 5. In Comparative Example 5, the line did not come out continuous but looked quite unnatural; this effect was particularly noticeable in viewing at an angle. Referring now to the viewing in ON state, the image had an obvious anisotropy in the horizontal direction and looked unnatural in Comparative Example 8. On the other hand, the deviation of the emerging light was small in Example 8.

When the light guide plate of Example 1 was brought into intimate contact with the liquid-crystal cell by means of a gel-based self-adhesive layer, a marked improvement was achieved in contrast, producing a clear display in both ON state and during illumination with extraneous light in OFF state. From the above-described facts, it can be seen that using the light guide plate and the planer light source unit according to the present invention, one can fabricate a bright and high-contrast reflection-type liquid-crystal display device.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light guide plate comprising:
an entrance end surface on which light is incident;
a top surface having light issuing means; and
a bottom surface from which the light emerges via said light issuing means,
wherein, a direction of maximum intensity of the emerging light as measured in a plane perpendicular to two reference planes defined by said entrance end surface and said bottom surface is within 30 degrees from a line normal to said bottom surface, and when a direction toward said entrance end surface away from the line normal to said bottom surface is assumed to be negative, intensity of light leaking form said top surface at the same angle as the direction of the maximum intensity is no more than a tenth of said maximum intensity, and incident light from the bottom surface is transmitted through said top surface.

2. A light guide plate according to claim 1, wherein luminance of the emerging light from said bottom surface as measured in the direction of the normal line to said perpendicular plane is no more than 60% of luminance in the direction of said maximum intensity.

3. A light guide plate according to claim 1, wherein quantity of the light leaking at solid angles within 30 degrees with reference to the normal line is no more than 1/8 of quantity of the light emerging from said bottom surface.

4. A light guide plate according to claim 1, wherein said light issuing means comprises a repetition of prismatic asperities each having a shorter side plane and a longer side plane and being arranged on a pitch of 50 μm to 1.5 mm, wherein said shorter side plane slopes downward from said entrance end surface to an opposed end to said entrance end surface at angles of inclination of 30 to 45 degrees with respect to the reference plane defined by said bottom surface, wherein said longer side plane is inclined at angles in excess of zero degrees and up to 10 degrees with respect to the reference plane defined by said bottom surface, with the variation in the angle of inclination of all the longer side planes as measured throughout the light guide plate being within 5 degrees, and difference in the angle of inclination between one longer side plane and a nearest longer side plane being within 1 degree, and wherein area of said longer side plane as projected onto the reference plane defined by said bottom surface is at least 5 times of projected area of said shorter side plane.

5. A light guide plate according to claim 4, wherein a width of each plane of the shorter side as projected onto the reference plane defined by said bottom surface is no more than 40 μm.

6. A light guide plate according to claim 4, wherein roundness of two vertexes in the prismatic asperities formed by said shorter side plane and two longer planes which are adjacent to said shorter plane is approximated by an arc of a circle, and sum of radii of the two arcs of a circle is no more than a half of a side length of said shorter side plane.

7. A light guide plate according to claim 4, wherein the prismatic asperities are arranged either parallel to or at an incline angle within ±35 degrees with the reference plane defined by said entrance end surface.

8. A light guide plate according to claim 1, wherein normal incident light from said bottom surface passes through said top surface at a total ray transmission of at least 90% and with a haze of no more than 15%.

9. A planer light source unit comprising:

(A) a light guide plate comprising:
an entrance end surface on which light is incident;
a top surface having light issuing means; and
a bottom surface from which the light emerges via said light issuing means,
wherein, a direction of maximum intensity of the emerging light as measured in a plane perpendicular to two reference planes defined by said entrance end surface and said bottom surface is within 30 degrees from a line normal to said bottom surface, when a direction toward said entrance end surface away from the line normal to said bottom surface is assumed to be negative, intensity of light leaking from said top surface at the same angle as the direction of the maximum intensity is no more than a tenth of said maximum intensity, and incident light from the bottom surface is transmitted through said top surface; and (B) a light source disposed adjacent to said entrance end surface.

10. A planer light source unit according to claim 9, wherein luminance of the emerging light from said bottom surface as measured in the direction of the normal line to said perpendicular plane is no more than 60% of luminance in the direction of said maximum intensity.

11. A planer light source unit according to claim 9, wherein quantity of the light leaking at solid angles within 30 degrees with reference to the normal line is no more than 1/8 of quantity of the light emerging from said bottom surface.

12. A planer light source unit according to claim 9, wherein said light issuing means comprises a repetition of prismatic asperities each having a shorter side plane and a longer side plane and being arranged on a pitch of 50 μm to 1.5 mm, wherein said shorter side plane slopes downward from said entrance end surface to an opposed end to said entrance end surface at angles of inclination of 30 to 45 degrees with respect to the reference plane defined by said bottom surface, wherein said longer side plane is inclined at angles in excess of zero degrees and up to 10 degrees with respect to the reference plane defined by said bottom surface, with the variation in the angle of inclination of all the longer side planes as measured throughout the light guide plate being within 5 degrees, and difference in the angle of inclination between one longer side plane and a nearest longer side plane being within 1 degree, and wherein area of said longer side plane as projected onto the reference plane defined by said bottom surface is at least 5 times of projected area of said shorter side plane.

13. A planer light source unit according to claim 12, wherein a width of each plane of the shorter side as projected onto the reference plane defined by said bottom surface is no more than 40 μm.

14. A planer light source unit according to claim 12, wherein roundness of two vertexes in the prismatic asperities formed by said shorter side plane and two longer planes which are adjacent to said shorter plane is approximated by an arc of a circle, and sum of radii of the two arcs of a circle is no more than a half of a side length of said shorter side plane.

15. A planer light source unit according to claim 12, wherein the prismatic asperities are arranged either parallel to or at an incline angle within ±35 degrees with the reference plane defined by said entrance end surface.

16. A planer light source unit according to claim 9, wherein normal incident light from said bottom surface passes through said top surface at a total ray transmission of at least 90% and with a haze of no more than 15%.

17. A reflection-type liquid-crystal display device comprising:

(A) a light guide plate comprising:
  an entrance end surface on which light is incident;
  a top surface having light issuing means; and
  a bottom surface from which the light emerges via said light issuing means,
    wherein, a direction of maximum intensity of the emerging light as measured in a plane perpendicular to two reference planes defined by said entrance end surface and said bottom surface is within 30 degrees from a line normal to said bottom surface,
    when a direction toward said entrance end surface away from the line normal to said bottom surface is assumed to be negative, intensity of light leaking from said top surface at the same angle as the direction of the maximum intensity is no more than a tenth of said maximum intensity, and
    incident light from the bottom surface is transmitted through said top surface;
(B) a light source disposed adjacent to said entrance end surface; and
(C) a reflective layer having a liquid-crystal cell and provided beneath said bottom surface.

18. A reflection-type liquid-crystal display device according to claim 17, wherein luminance of the emerging light from said bottom surface as measured in the direction of the normal line to said perpendicular plane is no more than 60% of luminance in the direction of said maximum intensity.

19. A reflection-type liquid-crystal display device according to claim 17, wherein quantity of the light leaking at solid angles within 30 degrees with reference to the normal line is no more than 1/8 of quantity of the light emerging from said bottom surface.

20. A reflection-type liquid-crystal display device according to claim 17, wherein said light issuing means comprises a repetition of prismatic asperities each having a shorter side plane and a longer side plane and being arranged on a pitch of 50 μm to 1.5 mm,
  wherein said shorter side plane is an inclined surface which slopes downward from said entrance end surface to an opposed end to said entrance end surface at angles of inclination of 30 to 45 degrees with respect to the reference plane defined by said bottom surface,
  wherein said longer side plane is inclined at angles in excess of zero degrees and up to 10 degrees with respect to the reference plane defined by said bottom surface, with the variation in the angle of inclination of all the longer side planes as measured throughout the light guide plate being within 5 degrees, and difference in the angle of inclination between one longer side plane and a nearest longer side plane being within 1 degree, and
  wherein area of said longer side plane as projected onto the reference plane defined by said bottom surface is at least 5 times of projected area of said shorter side plane.

21. A reflection-type liquid-crystal display device according to claim 20, wherein a width of each plane of the shorter side as projected onto the reference plane defined by said bottom surface is no more than 40 μm.

22. A reflection-type liquid-crystal display device according to claim 20, wherein roundness of two vertexes in the prismatic asperities formed by said shorter side plane and two longer planes which are adjacent to said shorter plane is approximated by an arc of a circle, and sum of radii of the two arcs of a circle is no more than a half of a side length of said shorter side plane.

23. A reflection-type liquid-crystal display device according to claim 20, wherein the prismatic asperities are arranged either parallel to or at an incline angle within ±35 degrees with the reference plane defined by said entrance end surface.

24. A reflection-type liquid-crystal display device according to claim 17, wherein normal incident light from said bottom surface passes through said top surface at a total ray transmission of at least 90% and with a haze of no more than 15%.

25. A reflection-type liquid-crystal display device according to claim 17, wherein said bottom surface of said light guide plate is brought into contact with a top surface of said liquid-crystal cell.

26. A light guide plate as set forth in claim 1, wherein said light issuing means comprises a repetition of prismatic asperities arranged on a pitch of 50 μm to 1/5 mm.

27. A light guide plate as set forth in claim 26, wherein a plane of said asperities slopes downward from said entrance end surface to an opposed end to said entrance end surface at angles of inclination of 30–45 degrees with respect to a reference plane defined by the bottom surface.

28. A light guide plate as set forth in claim 9, wherein said light issuing means comprises a repetition of prismatic asperities arranged on a pitch of 50 μm to 1/5 mm.

29. A light guide plate as set forth in claim 28, wherein a plane of said asperities slopes downward from said entrance end surface to an opposed end to said entrance end surface at angles of inclination of 30–45 degrees with respect to a reference plane defined by the bottom surface.

30. A light guide plate as set forth in claim 17, wherein said light issuing means comprises a repetition of prismatic asperities arranged on a pitch of 50 μm to 1/5 mm.

31. A light guide plate as set forth in claim 30, wherein a plane of said asperities slopes downward from said entrance end surface to an opposed end to said entrance end surface at angles of inclination of 30–45 degrees with respect to a reference plane defined by the bottom surface.

* * * * *